US 12,214,826 B2
United States Patent
Mogi et al.

(10) Patent No.: US 12,214,826 B2
(45) Date of Patent: Feb. 4, 2025

(54) FRONT STRUCTURE OF VEHICLE

(71) Applicant: Mazda Motor Corporation, Hiroshima (JP)

(72) Inventors: Hosei Mogi, Hiroshima (JP); Michiaki Sasaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 280 days.

(21) Appl. No.: 17/705,391

(22) Filed: Mar. 28, 2022

(65) Prior Publication Data
US 2022/0315123 A1 Oct. 6, 2022

(30) Foreign Application Priority Data
Apr. 5, 2021 (JP) .................. 2021-064051

(51) Int. Cl.
*B62D 25/08* (2006.01)
*B60S 1/04* (2006.01)
*B62D 25/24* (2006.01)

(52) U.S. Cl.
CPC .......... *B62D 25/081* (2013.01); *B60S 1/0438* (2013.01); *B62D 25/24* (2013.01); *B60S 1/0422* (2013.01)

(58) Field of Classification Search
CPC ..... B62D 25/081; B62D 25/24; B60S 1/0438; B60S 1/0422; B60S 1/0436
See application file for complete search history.

(56) References Cited

U.S. PATENT DOCUMENTS

| 9,623,913 | B2 * | 4/2017 | Yamamoto | ............. B62D 25/24 |
| 11,203,382 | B2 * | 12/2021 | Akizuki | ............... B62D 25/081 |
| 2013/0014339 | A1 * | 1/2013 | Templeton | ............ B60S 1/0433 15/250.31 |

(Continued)

FOREIGN PATENT DOCUMENTS

| DE | 102020114936 A1 | * | 12/2021 |
| JP | 2002145021 A | * | 5/2002 |
| JP | 2004314814 A | * | 11/2004 |

(Continued)

OTHER PUBLICATIONS

Notice of Reasons for Refusal mailed Sep. 10, 2024, in Japanese Application No. 2021-064051, 6 pages. (with English Translation).

*Primary Examiner* — James A Shriver, II
*Assistant Examiner* — Michael T. Walsh
(74) *Attorney, Agent, or Firm* — XSENSUS LLP

(57) ABSTRACT

A front structure of a vehicle includes an electrical component provided below a front windshield, and a gutter member, provided immediately behind the electrical component and below the front windshield, that receives the water dripping from the front windshield, in which the gutter member has a flow path portion through which the water drops dripping onto the gutter member flows in the vehicle width direction, and the flow path portion includes an uppermost portion that is set the highest at a position at which the electrical component is provided in the vehicle width direction, and inclined portions, disposed adjacent to the uppermost portion in the vehicle width direction, that extend downward toward the inner side in the vehicle width direction and the outer side in the vehicle width direction.

6 Claims, 12 Drawing Sheets

(56) References Cited

U.S. PATENT DOCUMENTS

2016/0339962 A1  11/2016  Yamamoto

FOREIGN PATENT DOCUMENTS

| JP | 2009126188 A | * | 6/2009 |
| JP | 2013230711 A | * | 11/2013 |
| JP | 2016185797 A | * | 10/2016 |
| JP | 2016-215755 A | | 12/2016 |
| KR | 920005377 B1 | * | 7/1992 |

* cited by examiner

FRONT STRUCTURE OF VEHICLE

CROSS-REFERENCE TO RELATED APPLICATION

The present application claims priority to Japanese Patent Application 2021-064051, filed Apr. 5, 2021, the entire contents of which are incorporated herein by reference.

BACKGROUND

Field

The present disclosure relates to a front structure of a vehicle and, more particularly, to a front structure of a vehicle that includes an electrical component provided below a front windshield and a gutter member, provided immediately behind the electrical component and below the front windshield, that receives water dripping from the front windshield.

Description of the Related Art

There is a conventionally known structure in which a gutter member (cowl center) is provided to suppress the exposure of an electrical component such as a wiper motor to the water dripping from the front windshield (see patent document 1).

However, if a cover member that covers auxiliaries such as a battery from above is provided in the front area on the outer side in the vehicle width direction of a cowl grille, a wide opening is required to ensure access to the auxiliaries below the cover member during maintenance or the like, the structure has a layout in which the electrical component described above is close to the front windshield in the vehicle front-rear direction.

In particular, an FR (front-engine rear-drive) system with an engine unit disposed longitudinally often has a layout in which the electrical component close to the front windshield because the rear portion of the engine unit is close to the dash lower panel.

In this case, there is a problem with the layout in that the dimensions in the vehicle front-rear direction of the gutter member for achieving the drain function of the gutter member described above cannot be sufficiently obtained and the wiper motor as the electrical component needs to be disposed at a position away from a pair of wiper pivots.

PRIOR ART DOCUMENTS

Patent Documents

[Patent document 1] JP-A-2016-215755

SUMMARY

Technical Problems

Accordingly, an object of the present disclosure is to provide the front structure of a vehicle that can suppress the exposure of the electrical component to water even in the layout in which the distance in the vehicle front-rear direction between the front windshield and the electrical component is small.

Means for Solving the Problems

A front structure of a vehicle according to the present disclosure includes an electrical component provided below a front windshield; and a gutter member provided immediately behind the electrical component and below the front windshield, the gutter member receiving water dripping from the front windshield, in which the gutter member has a flow path portion through which water drops dripping onto the gutter member flows in a vehicle width direction, and in which the flow path portion includes an uppermost portion at which the electrical component is provided in the vehicle width direction, and an inclined portion disposed adjacent to the uppermost portion in the vehicle width direction, the inclined portion extending downward toward an inner side in the vehicle width direction and an outer side in the vehicle width direction. The electrical component described above may be a wiper motor. In addition, the gutter member described above may be set in the cowl center.

According to the structure described above, since the water dripping from the front windshield onto the uppermost portion of the flow path portion of the gutter member at the position at which the electrical component is provided flows to the inclined portion immediately after dripping onto the uppermost portion, the exposure of the electrical component to water can be suppressed even if the dimensions of the gutter member at the position at which the electrical component is provided in the front-rear direction and in the vertical direction are small.

In short, even in a layout in which the distance in the vehicle front-rear direction between the front windshield and the electrical component is small, the exposure of the electrical component to water can be suppressed.

In an embodiment of the present disclosure, the width in the vehicle front-rear direction of the flow path portion in the uppermost portion is set to be the smallest among the other portions.

The flow path portion described above is the region in which the path cross section has a concave shape and the portion for drainage not having a concave cross section is excluded from the flow path portion.

According to the structure described above, even if the width in the front-rear direction of the flow path portion of the uppermost portion is the minimum and the drain capacity is low, the exposure of the electrical component to water can be suppressed.

In the embodiment of the present disclosure, the electrical component is the wiper motor, the wiper motor is located between the wiper pivots, and the wiper pivots have the pivot drain paths that drain the water drops dripping from the flow path portion downward.

Since the wiper pivots have the pivot drain paths and the pivot drain paths drain the water drops dripping from the flow path portion downward in the structure described above, the drain capacity of the gutter member can be improved. In addition, the pivot drain paths described above may be used as part of the drain route.

In the embodiment of the present disclosure, one of the pair of wiper pivots is provided on the inner side in the vehicle width direction and the other of the pair of wiper pivots is provided on the outer side in the vehicle width direction, the auxiliary cover that covers, from above, the case that houses the auxiliaries is provided below the pivot drain path of the other of the wiper pivots that is provided on the outer side in the vehicle width direction, and the auxiliary cover has the cover inclined portion that is inclined downward toward the outer side in the vehicle width direction.

The auxiliaries described above may be the fuse box.

According to the structure described above, the water drops dripping onto the upper surface of the auxiliary cover from the gutter member via the pivot drain path can be drained to the outer side in the vehicle width direction along the inclination direction of the cover inclined portion to suppress the exposure of the auxiliaries to water. In addition, the auxiliary cover described above may be used as part of the drain route.

In the embodiment of the present disclosure, the lower end of the auxiliary cover is offset to the outer side in the vehicle width direction from the upper end of the case that houses the auxiliaries.

According to the structure described above, the offset structure suppresses the filtration of water into the case from the lower end of the cover of the auxiliaries due to a capillary phenomenon, thereby further suppressing the exposure of the auxiliaries to water.

By the way, when the lower end of the auxiliary cover is not offset from the upper end of the case, water infiltrates into the case due to a capillary phenomenon, but the structure described above suppresses the filtration of water.

Advantages

The present disclosure has the effect of suppressing the exposure of the electrical component to water even in the layout in which the distance in the vehicle front-rear direction between the front windshield and the electrical component is small.

DESCRIPTION OF EMBODIMENTS

Even in a layout in which the distance in a vehicle front-rear direction between a front windshield and an electrical component is small, an object of suppressing the exposure of the electrical component to water is achieved by a structure including the electrical component provided below the front windshield; and a gutter member provided immediately behind the electrical component and below the front windshield, the gutter member receiving water dripping from the front windshield, in which the gutter member has a flow path portion through which water drops dripping onto the gutter member flows in a vehicle width direction, and in which the flow path portion includes an uppermost portion that is set the highest at a position at which the electrical component is provided in the vehicle width direction, and an inclined portion disposed adjacent to the uppermost portion in the vehicle width direction, the inclined portion extending downward toward an inner side in the vehicle width direction and an outer side in the vehicle width direction.

Example

One example of the present disclosure will be described in detail below with reference to the drawings.

Figure 1:
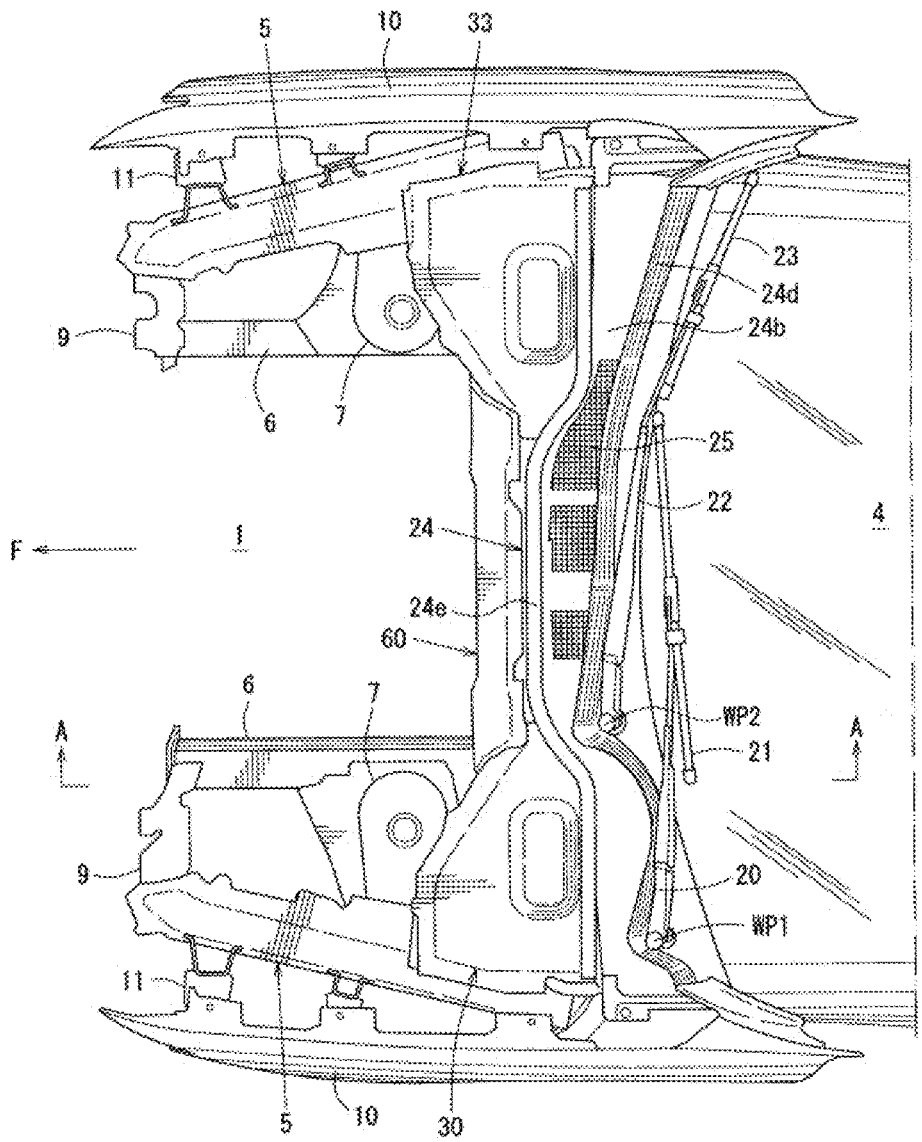
FIG. 1 is a plan view of a vehicle front portion having a front structure of a vehicle according to the present disclosure.
Figure 2:
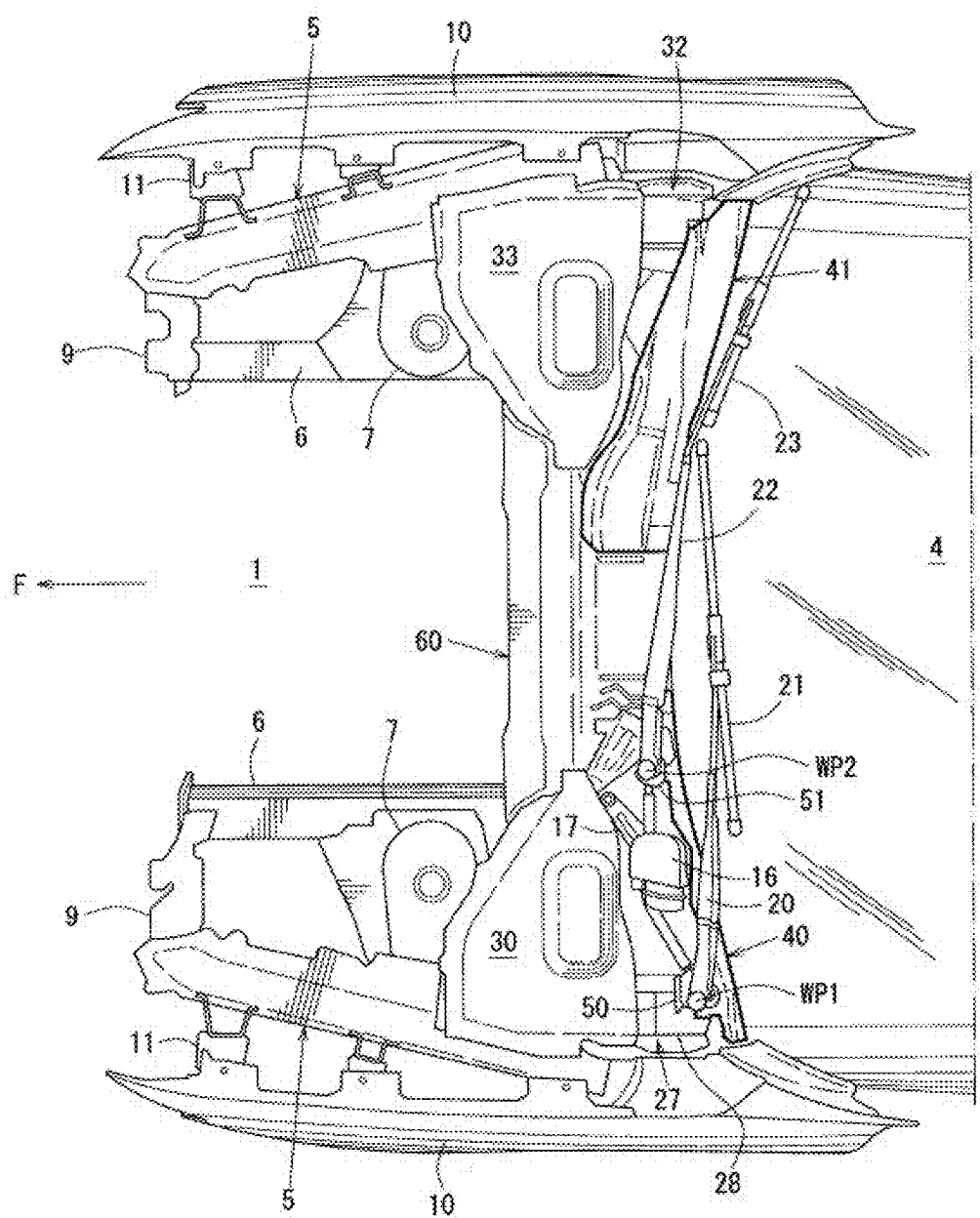
FIG. 2 is a plan view of the vehicle front portion in which a cowl grille has been removed from FIG. 1.
Figure 3:
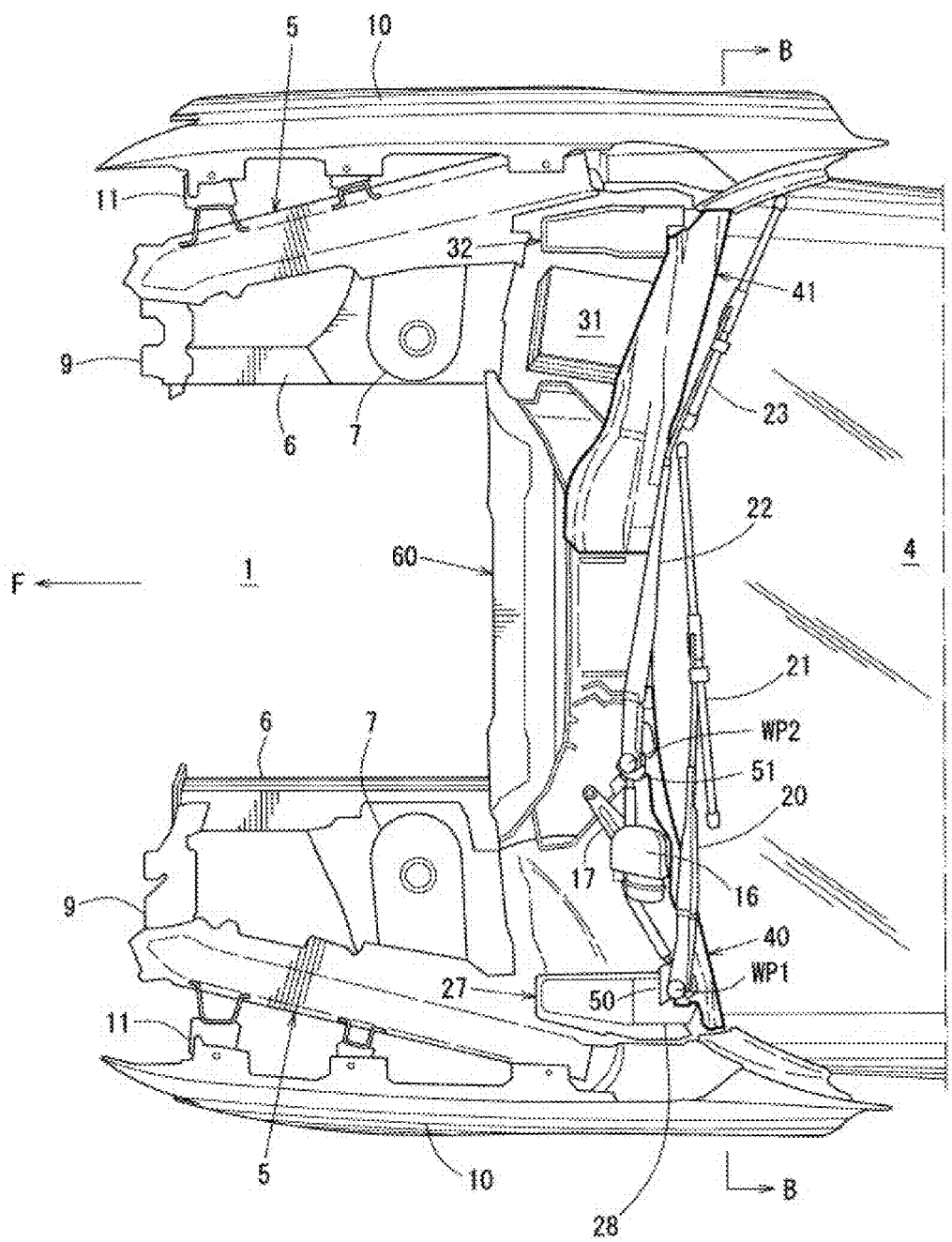
FIG. 3 is a plan view of the vehicle front portion in which a cover member has been removed from FIG. 2.

The drawings illustrate the front structure of a vehicle, FIG. 1 is a plan view of the vehicle front portion having the front structure of the vehicle, FIG. 2 is a plan view of the vehicle front portion in which the cowl grille has been removed from FIG. 1, and FIG. 3 is a plan view of the vehicle front portion in which the cover member has been removed from FIG. 2.

Figure 4:
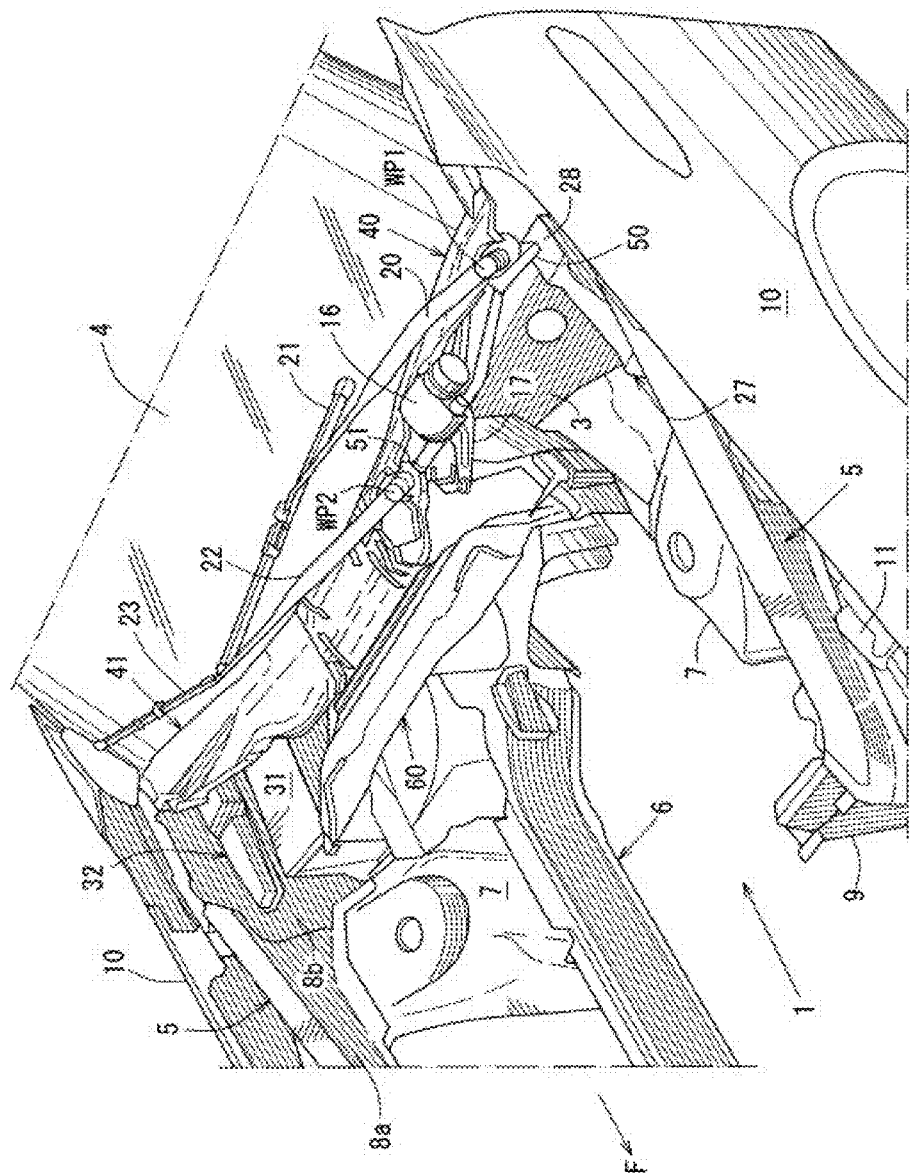
FIG. 4 is a perspective view of FIG. 3.
Figure 5:
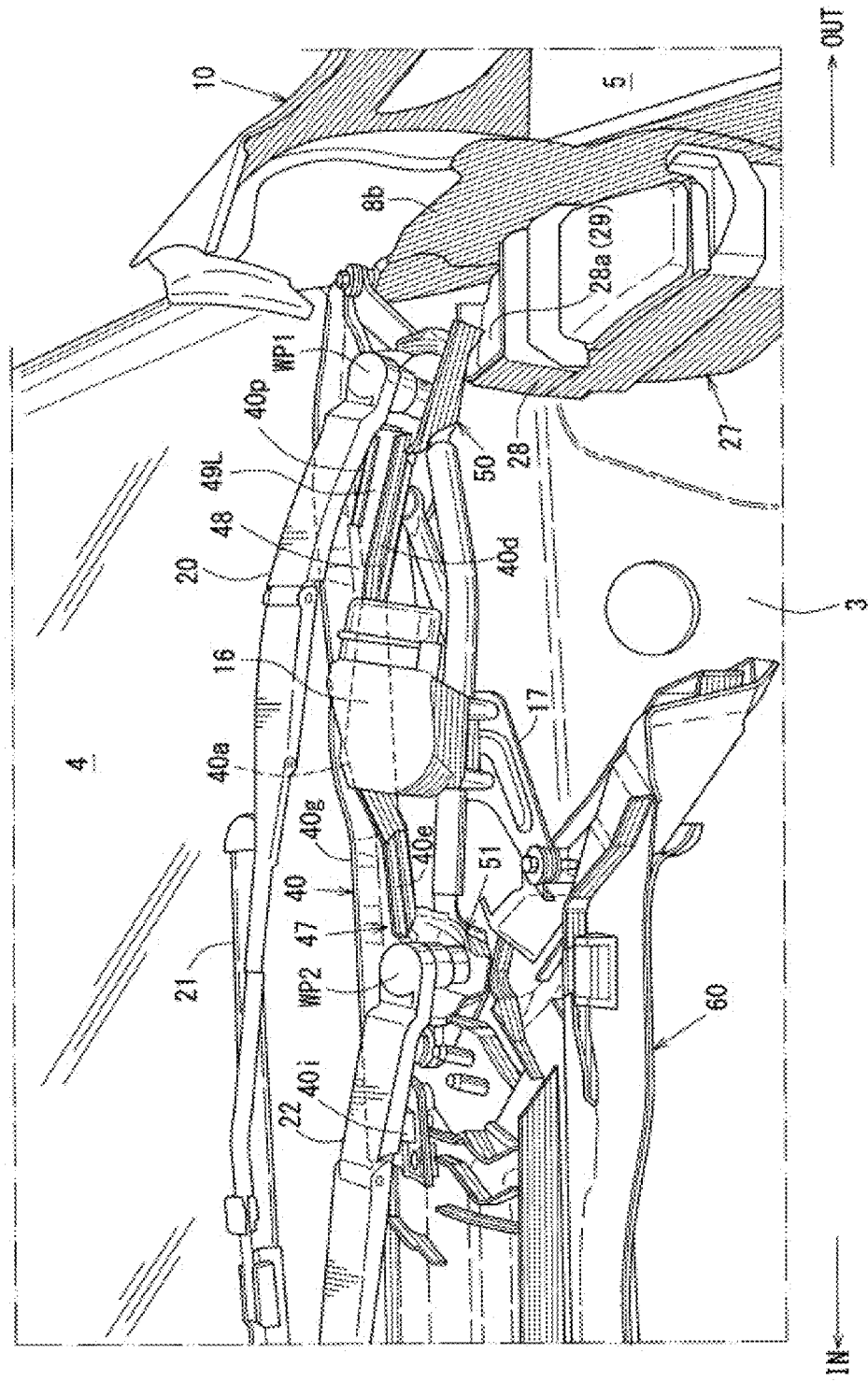
FIG. 5 is a front view illustrating a wiper motor and the surrounding structure thereof.
Figure 6:
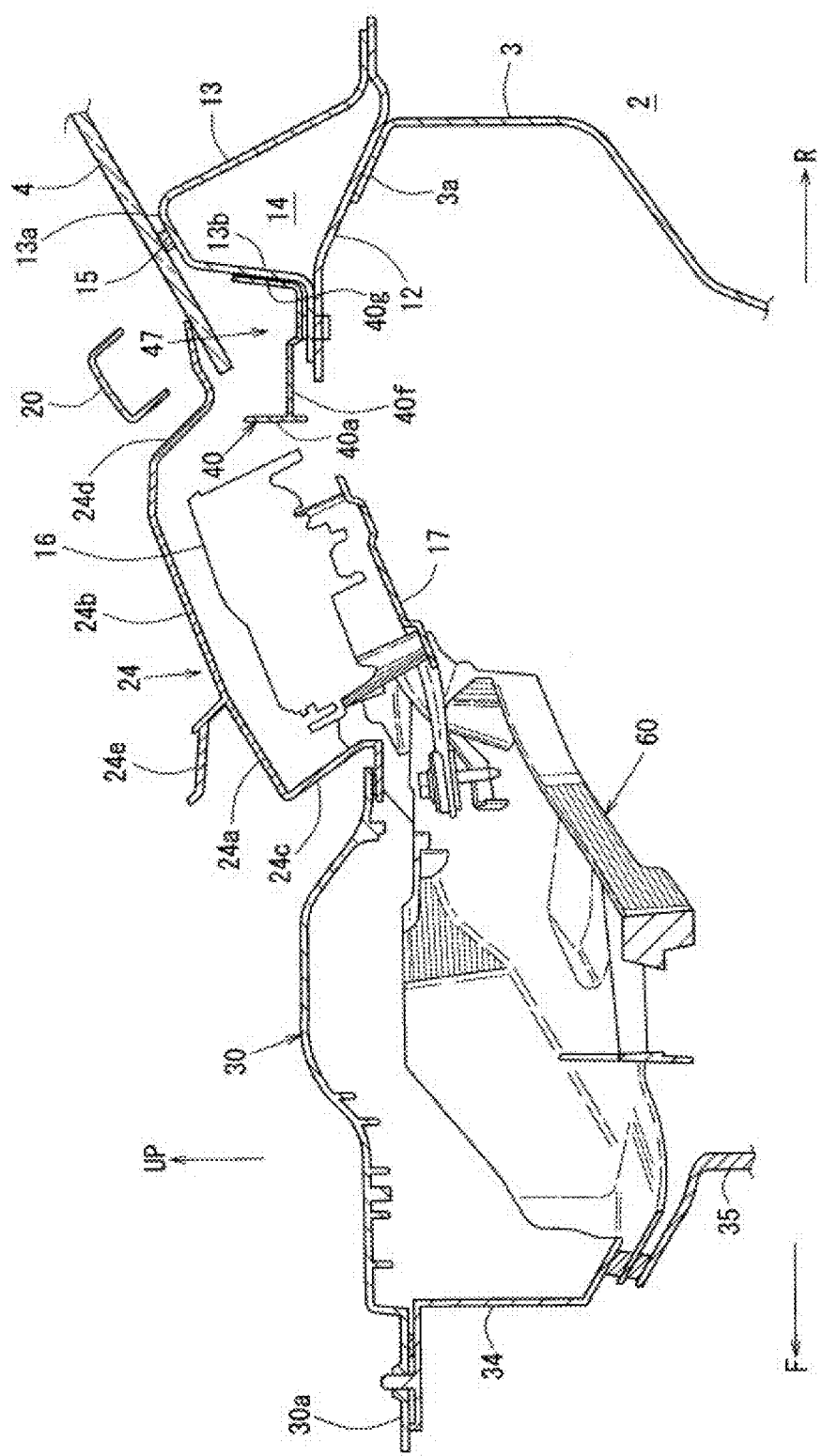
FIG. 6 is a sectional view of a main portion seen along arrows A-A in FIG. 1.
Figure 7:
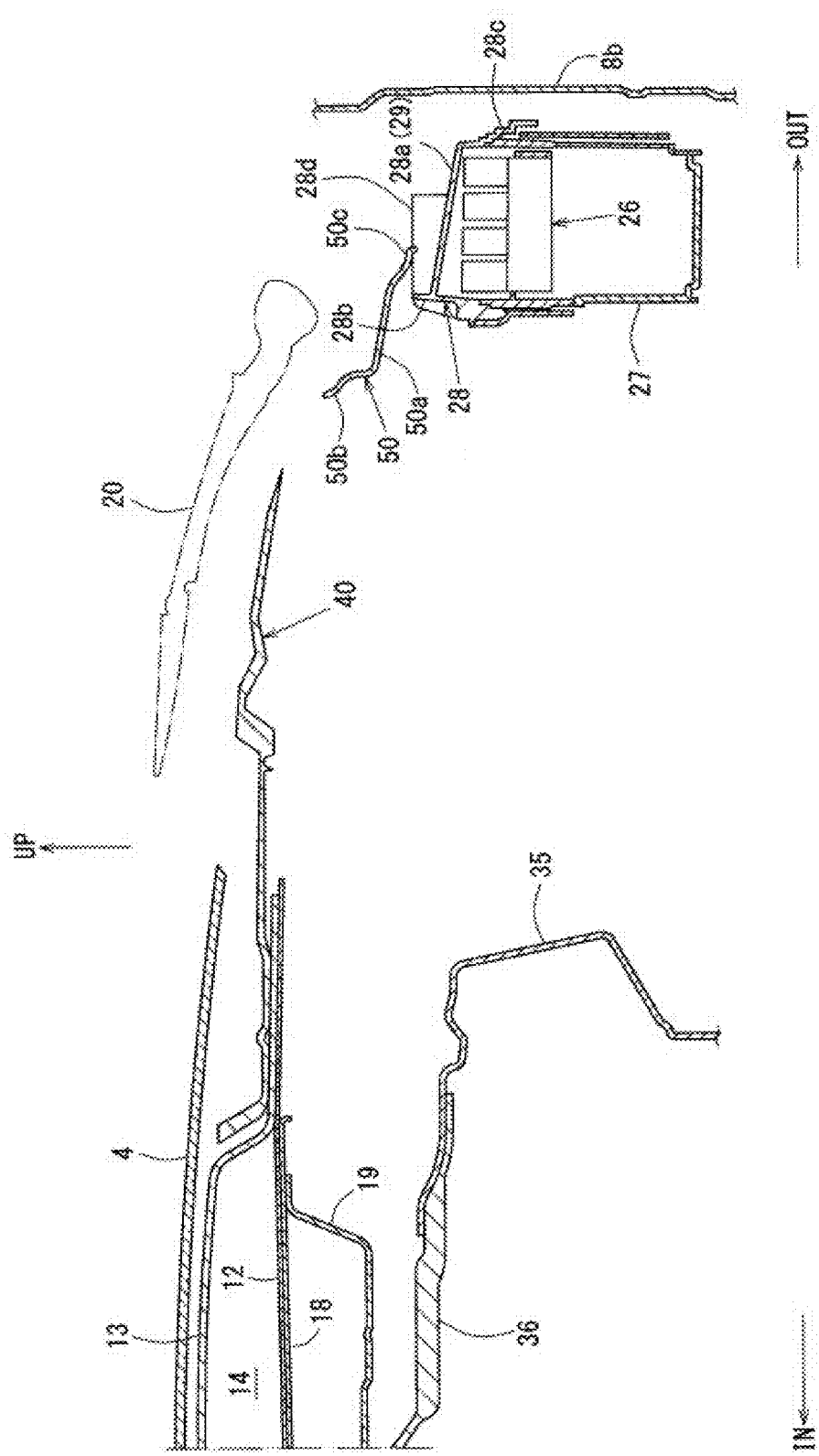
FIG. 7 is a sectional view of the main portion seen along arrows B-B in FIG. 3.

In addition, FIG. 4 is a perspective view of FIG. 3, FIG. 5 is a front view illustrating a wiper motor as the electrical component and the surrounding structure thereof, FIG. 6 is a sectional view of a main portion seen along arrows A-A in FIG. 1, and FIG. 7 is a sectional view of the main portion seen along arrows B-B in FIG. 3.

Before the front structure of a vehicle is described, a front body structure will be first described.

As illustrated in FIG. 6, there is provided a dash lower panel 3 as a dash panel that separates an engine compartment 1 (see FIGS. 1 to 4) from a vehicle interior 2 in the vehicle front-rear direction. This dash lower panel 3 extends in the vehicle width direction and the left and right end portions in the vehicle width direction of the dash lower panel 3 are coupled to hinge pillars.

The hinge pillars described above are erected so as to extend in the vehicle vertical direction. Each of the hinge pillars is the vehicle body strengthening member that joins and fixes a hinge pillar inner and a hinge pillar outer to each other and has a hinge pillar closed cross-section extending in the vehicle vertical direction.

The lower end portion of the hinge pillar described above is provided with a side sill extending from the lower end portion to the vehicle rear. This side sill is the vehicle body strengthening member that joins and fixes a side sill inner and a side sill outer to each other and has a side sill closed cross section extending in the vehicle front-rear direction.

In addition, the upper end portion of the hinge pillar described above is provided with a front pillar extending backward and diagonally upward from the upper end portion. This front pillar is the vehicle body strengthening member that joins and fixes a front pillar inner and a front pillar outer to each other and has a front pillar closed cross-section extending diagonally rear upward of the vehicle.

As illustrated in FIGS. 1 to 4, a front windshield 4 (so-called front window glass) is provided in an opening, which is surrounded and formed by a pair of left and right front pillars, a front header disposed on the front side of the upper portion of the vehicle, and a cowl panel 13 described later, in which the front windshield is disposed.

Here, the dash lower panel 3 described above is the panel member that is located in the lower end portion of the front windshield 4 and separates the engine compartment 1 from the vehicle interior 2 in the vehicle front-rear direction while extending in the vehicle width direction, as illustrated in FIG. 6.

On the other hand, as illustrated in FIGS. 1 to 4, a pair of left and right apron reinforcements 5 extending to the vehicle front from the front portions of the upper ends of the left and right hinge pillars described above are provided in front portions of the upper ends.

As illustrated in FIGS. 1 to 4, there is provided a pair of left and right front side frames 6 extending to the vehicle front from both ends in the vehicle width direction of the dash lower panel 3. The front side frames 6 are located on the inner side in the vehicle width direction and on the lower side in the vehicle vertical direction of the apron reinforcements 5 described above.

In addition, each of the front side frames 6 described above is the vehicle body strengthening member that joins and fixes a front side frame inner and a front side frame outer to each other and has a front side frame closed cross section extending in the vehicle front-rear direction.

As illustrated in FIGS. 1 to 4, there is provided suspension tower portions 7 that project upward while being fixed to the front side frames 6 described above and support the upper portions of the dampers of front suspension devices. As illustrated in FIG. 4, each of the suspension tower portions 7 is mounted across a front side panel 8a constituting the inner side surface of the apron reinforcement 5 and the front side frame 6 described above. Here, strut tower portions may be adopted as the suspension tower portions 7 described above.

Rear side panels 8b are provided so as to be continuous with the front side panels 8a described above in the vehicle front-rear direction (see FIGS. 4 and 7).

As illustrated in FIGS. 1 to 4, there are provided coupling members 9 that couple the front end portions of the front side frames 6 and the front portions of the apron reinforcements 5 to each other in the vehicle vertical direction.

On the other hand, as illustrated in FIGS. 1 to 4, the left and right side portions in the vehicle width direction of the engine compartment 1 described above are covered with front fender panels 10. In addition, a bonnet covers the engine compartment 1 described above from above with in an openable and closable manner.

Here, as illustrated in FIGS. 1 to 3, the front fender panel 10 described above is fixed to the apron reinforcement 5 with a plurality of mounting members 11. In addition, the bonnet described above includes a bonnet outer panel and a bonnet inner panel and the bonnet outer panel is integrated with the bonnet inner panel by hemming the peripheral portion of the bonnet outer panel.

As illustrated in FIG. 6, an upper end bent portion 3a of the dash lower panel 3 described above is provided with the cowl panel 13 having a substantially hat-shaped cross section via a dash upper panel 12. A cowl closed cross section 14 extending in the vehicle width direction is formed between the cowl panel 13 and the dash upper panel 12 described above to improve the rigidity of the cowl portion.

As illustrated in FIG. 6, the front windshield 4 described above is attached to an upper wall portion 13a, which is inclined in a front-low-back-high manner, of the cowl panel 13 described above via an adhesive 15.

As illustrated in FIG. 6, the wiper motor 16 as the electrical component is provided below the left portion in the vehicle width direction of the front windshield 4 described above. This wiper motor 16 is supported by a wiper motor support bracket 17 illustrated in FIGS. 5 and 6.

In addition, as illustrated in FIG. 5, the wiper motor 16 described above is disposed between a pair of wiper pivots WP1 and WP2 spaced apart from each other in the vehicle width direction.

As illustrated in FIGS. 1 to 4, a wiper blade 21 is attached to one wiper pivot WP1 located on the left end side in the vehicle width direction via a wiper arm 20 and a wiper blade 23 is attached to the other wiper pivot WP2 located on the inner side in the vehicle width direction of the wiper pivot WP1 via a wiper arm 22.

When the wiper motor 16 described above is driven, the left and right wiper blades 21 and 23 are driven simultaneously about the pair of the wiper pivot WP1 and WP2 as the fulcrums via the left and right wiper arms 20 and 22 to wipe out the front windshield 4.

As illustrated in FIGS. 1 and 6, a cowl grille 24 located toward the vehicle front from the dash lower panel 3 is provided below (diagonally below the front windshield 4 in this example) the front windshield 4 and above the wiper motor 16.

As illustrated in FIG. 1, this cowl grille 24 extends across substantially the entire width in the vehicle width direction. In addition, as illustrated in FIG. 6, this cowl grille 24 includes front and rear upper surface portions 24a and 24b, front and rear vertical wall portions 24c and 24d, and a cowl seal mount portion 24e on which a cowl seal is mounted.

Furthermore, as illustrated in FIG. 1, in an upper surface portion 24b behind the cowl grille 24 described above, an outside air introduction hole 25 having a mesh structure is opened and formed in a portion shifted to the right in the vehicle width direction from the middle portion in the vehicle width direction.

As illustrated in FIGS. 1 and 3, in front of the left portion in the vehicle width direction of the cowl grille 24, there is provided a cover member 30 (see FIG. 1) that covers, from above, a reservoir tank as one of the auxiliaries and a case 27 that houses a fuse box 26 (see FIG. 7) as one of the auxiliaries.

In addition, as illustrated in FIGS. 1 and 3, in front of the right portion in the vehicle width direction of the cowl grille 24, there is provided a cover member 33 (see FIG. 1) that covers, from above, a battery 31 as one of the auxiliaries and a case 32 that houses the fuse box as one of the auxiliaries.

As illustrated in FIG. 6, a flange portion 30a is formed integrally with the front portion of the left cover member 30 and a partition member 34 made of an insulator is provided between the lower surface of the flange portion 30a and a drain member 60 described later.

As illustrated in FIGS. 2, 3, and 4, cowl centers 40 and 41 as left and right gutter members are provided spaced apart from each other in the middle portion in the vehicle width direction below the front windshield 4. These cowl centers 40 and 41 are the rain gutter members that receive the water dripping from the front windshield 4.

FIG. 6 illustrates only one cowl center 40, but the left and right cowl centers 40 and 41 are provided so as to extend from the front wall portion 13b of the cowl panel 13 to the vehicle front. The cowl center 40 on the vehicle left side is provided immediately behind the wiper motor 16 (electrical component) described above as illustrated in FIGS. 5 and 6.

Figure 8:
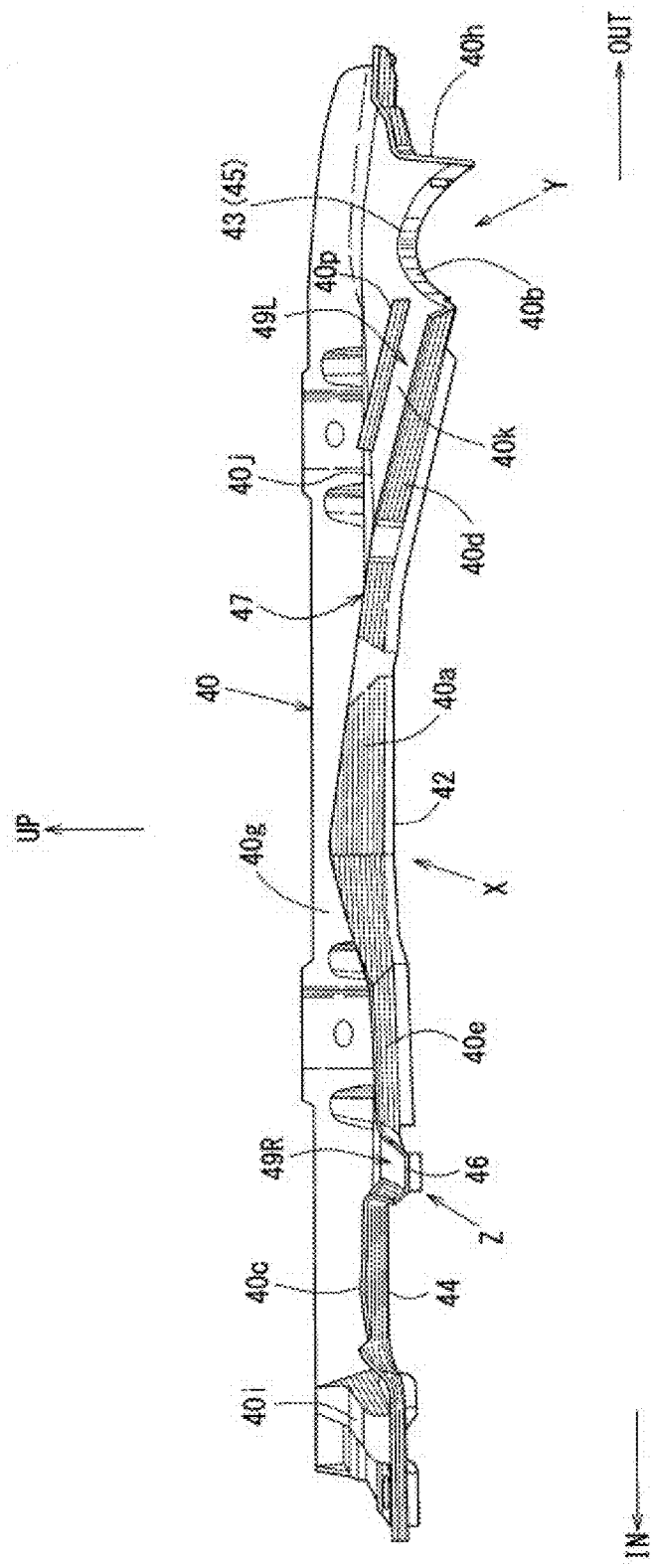
FIG. 8 is a front view of a cowl center.
Figure 9:
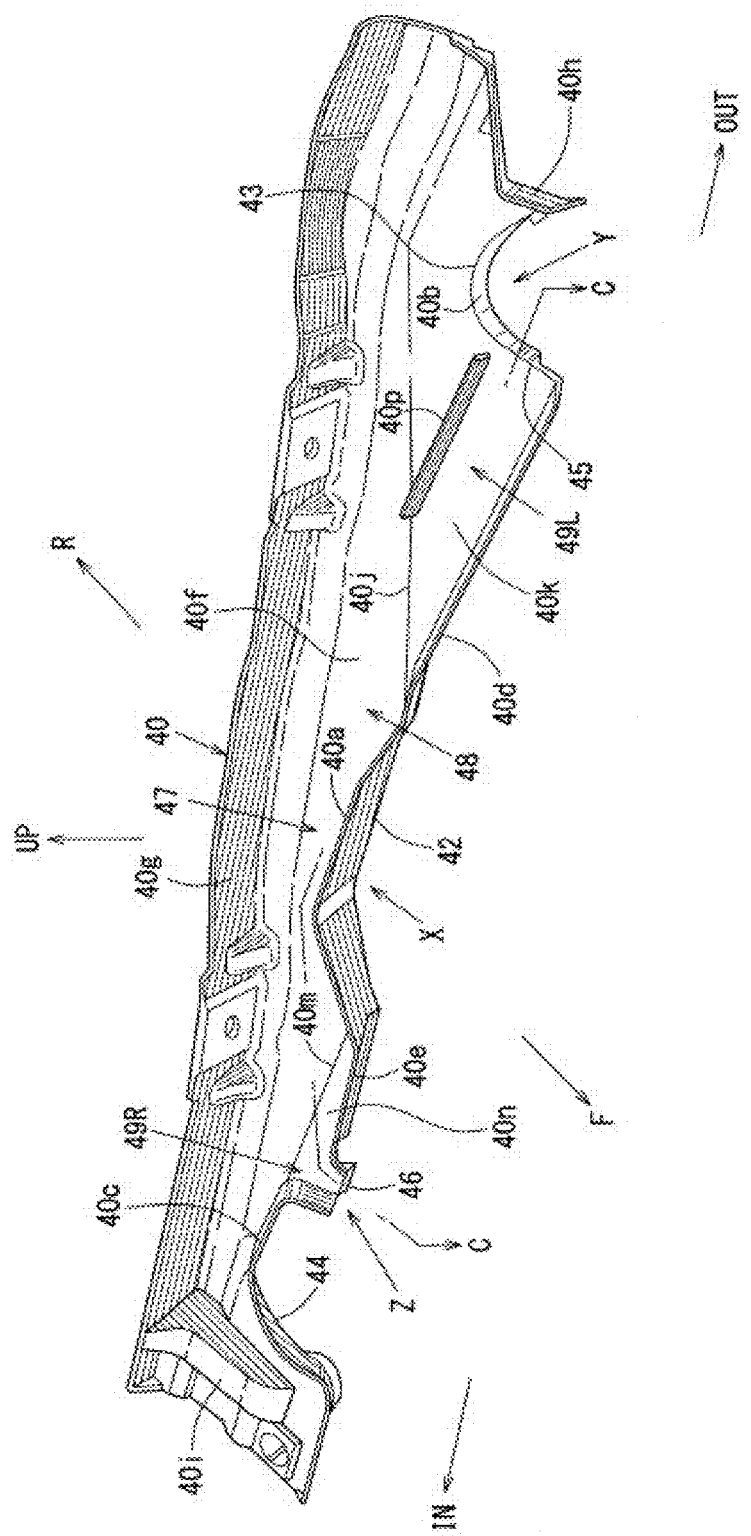
FIG. 9 is a perspective view of the cowl center.
Figure 10:
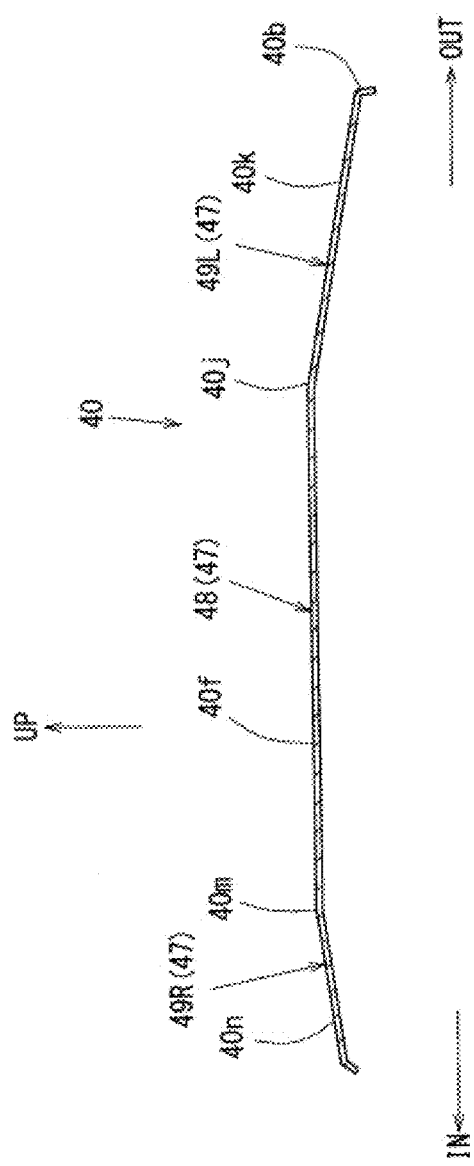
FIG. 10 is a sectional view seen along arrows C-C in FIG. 9.
Figure 11A:
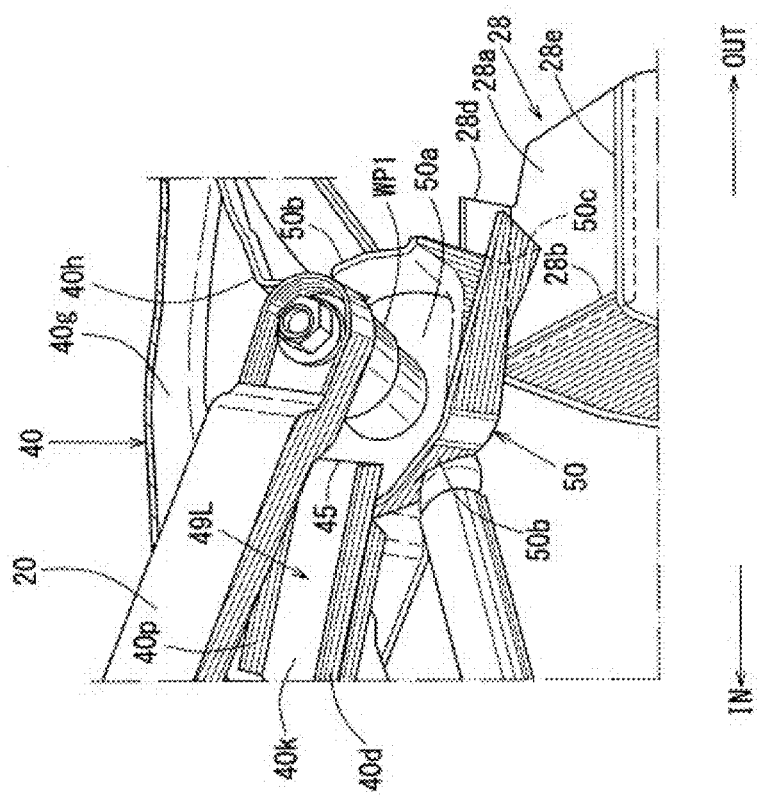
FIG. 11A is a perspective view illustrating a pivot drain structure of the inner side in the vehicle width direction and FIG. 11B is a perspective view illustrating a pivot drain structure of the left end portion in the vehicle width direction.
Figure 11B:
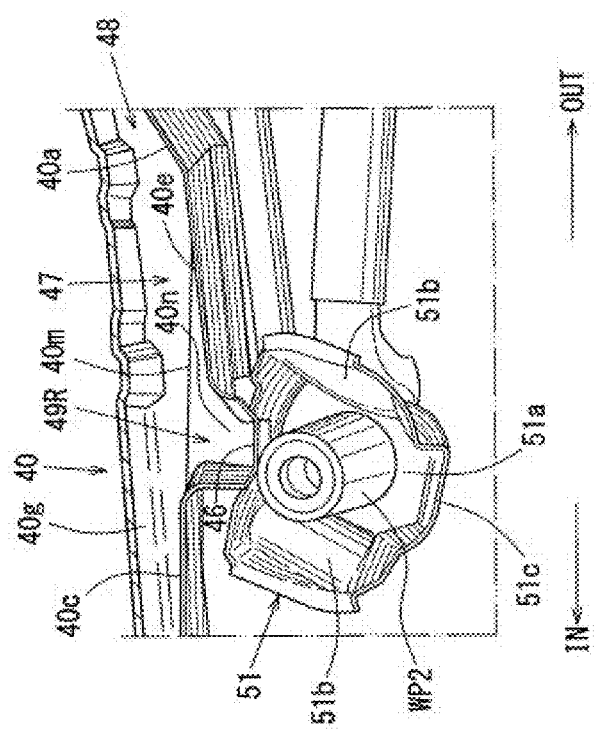
Figure 12:
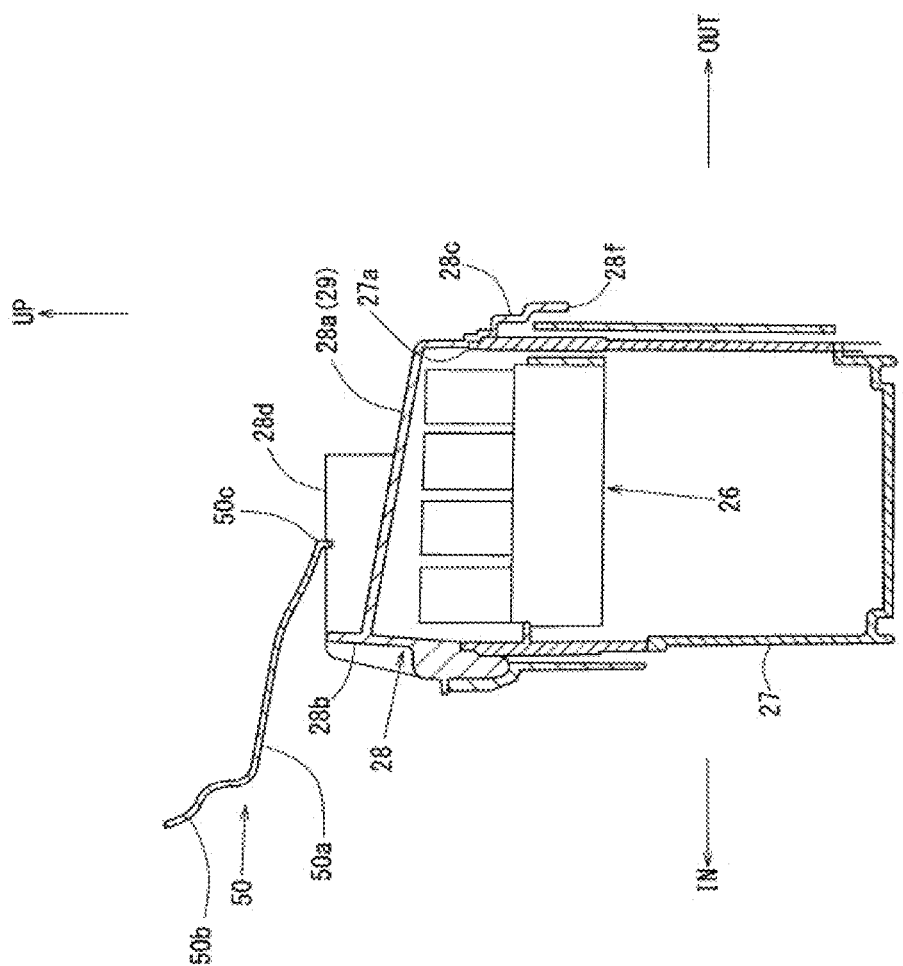
FIG. 12 is an enlarged view of the main portion in FIG. 7.

FIG. 8 is a front view of the cowl center 40, FIG. 9 is a perspective view of the cowl center, FIG. 10 is a sectional view seen along arrows C in FIG. 9, FIG. 11A is a perspective view illustrating a pivot drain structure on the inner side in the vehicle width direction, FIG. 11B is a perspective view illustrating a pivot drain structure on the left end side in the vehicle width direction, and FIG. 12 is an enlarged view of the main portion in FIG. 7.

As illustrated in FIGS. 8 and 9, the cowl center 40 described above has a recess portion 42 recessed toward the vehicle rear in vehicle plan view at a position X at which the wiper motor 16 in front of the middle portion in the longitudinal direction thereof is provided and has a front wall 40a rising upward from the peripheral edge of the recess portion 42.

In addition, the cowl center 40 described above has a recess portion 43 recessed toward the vehicle rear in vehicle plan view at a position Y at which one wiper pivot WP1 in front of the left portion in the vehicle width direction is provided and has a skirt portion 40b extending downward from the peripheral edge of the recess portion 43.

Furthermore, the cowl center 40 described above has a recess portion 44 recessed toward the vehicle rear in vehicle plan view near the right side in the vehicle width direction of a position Z at which the other wiper pivot WP2 in front of the right portion in the vehicle width direction thereof is provided and has a vertical wall 40c rising upward from the peripheral edge of this recess portion 44.

The left recess portion 43 described above at the position Y is an outflow portion 45 for the dripped water drops.

An outflow portion 46 for dripped water drops is provided at the position Z adjacent to the left side in the vehicle width direction of the right recess portion 44.

In addition, a partition wall 40d rising upward is provided between the left end in the vehicle width direction of the front wall 40a at the position X and the front portion of the right end in the vehicle width direction of the recess portion 43 at the position Y.

Furthermore, a partition wall 40e rising upward is provided between the right end in the vehicle width direction of the front wall 40a at the position X described above and the front portion of the left end in the vehicle width direction of the outflow portion 46.

As illustrated in FIG. 9, the cowl center 40 described above has a bottom wall 40f extending in the longitudinal direction thereof and a rear wall 40g including this bottom wall 40f and rising upward from the entire width in the vehicle width direction of the cowl center 40, and a side wall 40h is provided between the front portion of the left end in the vehicle width direction of the recess portion 43 described above and the left end in the vehicle width direction of the rear wall 40g.

In addition, a weir portion 40i extending in the vehicle front-rear direction is provided between the right side in the vehicle width direction of the recess portion 44 and the right side in the vehicle width direction of the rear wall 40g.

As illustrated in FIG. 9, an inclined wall 40k extending downward toward the outer side in the vehicle width direction is formed via a ridge line 40j on the left side in the vehicle width direction of the bottom wall 40f described above.

In addition, an inclined wall 40n extending downward toward the inner side in the vehicle width direction is formed via a ridge line 40m on the right side in the vehicle width direction of the bottom wall 40f described above.

Furthermore, a middle partition wall 40p, parallel to the partition wall 40d, that rises upward is provided in the middle in the front-rear direction of the inclined wall 40k.

Then, the walls 40a, 40c, 40d, 40e, 40f, 40g, 40k, 40n, and 40p described above form a flow path portion 47 through which the water drops having dripped on the cowl center 40 flow to both the left and right sides in the vehicle width direction.

This flow path portion 47 includes an uppermost portion 48 that is set to be the highest at the position X at which the wiper motor 16 is provided in the vehicle width direction and inclined portions 49L and 49R that are adjacent to the uppermost portion 48 in the vehicle width direction via the ridge lines 40j and 40m and extend downward toward the outer side and the inner side in the vehicle width direction.

The uppermost portion 48 described above is formed to have a concave path cross-section by the walls 40a, 40f, and 40g, one inclined portion 49L is formed to have a concave path cross-section by the walls 40d, 40k, and 40p, and the other inclined portion 49R is formed to have a concave path cross-section by the walls 40c, 40e, and 40n.

The inclined portion 49L extending downward toward the outer side in the vehicle width direction communicates with one outflow portion 45, and the inclined portion 49R extending downward toward the inner side in the vehicle width direction communicates with the other outflow portion 46.

As described above, the flow path portion 47 has the uppermost portion 48 that is the highest at the position X at which the wiper motor 16 is provided and the inclined portions 49L and 49R, adjacent to the uppermost portion 48 in the vehicle width direction, that extend downward toward the outer side in the vehicle width direction and the inner side in the vehicle width direction.

This causes the water dripping from the front windshield 4 onto the uppermost portion 48 of the flow path portion 47 of the cowl center 40 at the position X at which the wiper motor 16 is provided to immediately flow down to the inclined portions 49L and 49R and, even when the front-rear dimension and the vertical dimension of the cowl center 40 are small at the placement position X of the wiper motor 16, suppresses the exposure of the wiper motor 16 to water.

In addition, as illustrated in FIG. 9, the width in the vehicle front-rear direction of the flow path portion 47 in the uppermost portion 48 described above is set to be the smallest among the other portions. This suppresses the exposure of the wiper motor 16 to water even when the width in the front-rear direction of the flow path portion 47 in the uppermost portion 48 is the smallest and the drain capacity is low.

Furthermore, as illustrated in FIG. 5 and FIGS. 11A and 11B, the wiper motor 16 is located between the pair of wiper pivots WP1 and WP2 and the wiper pivots WP1 and WP2 have catch pans 50 and 51 as pivot drain paths that drain, downward, the water drops dripping from the inclined portions 49L and 49R of the flow path portion 47 described above.

As illustrated in FIG. 11B, the catch pan 50, corresponding to one wiper pivot WP1, that receives the water drops dripping from the outflow portion 45 at the end of the inclined portion 49L includes a bottom wall portion 50a, a peripheral wall portion 50b rising upward from the bottom wall portion 50a, and an outflow portion 50c that communicates with the bottom wall portion 50a described above. The bottom wall portion 50a described above is formed on the inclined surface that is inclined downward toward the vehicle front and the outer side in vehicle width direction to the outflow portion 50c.

As illustrated in FIG. 11A, the catch pan 51, corresponding to the other wiper pivot WP2, that receives the water drops dripping from the outflow portion 46 at the end of the inclined portion 49R includes a bottom wall portion 51a, a peripheral wall portion 51b rising upward from the bottom wall portion 51a, and an outflow portion 51c that communicates with the bottom wall portion 51a described above. The bottom wall portion 51a described above is formed on the inclined surface that is inclined downward toward the vehicle front and the inner side in the vehicle width direction to the outflow portion 51*c*.

Accordingly, the wiper pivots WP1 and WP2 have the catch pans 50 and 51 as the pivot drain paths, the catch pans 50 and 51 drain the water drops dripping from the outflow portions 45 and 46 of the flow path portion 47 downward, and improves the drain capacity of the cowl center 40. In addition, the catch pan 50 and 51 described above are used as part of the drain route.

By the way, as illustrated in FIGS. 7 and 12, the case 27 (auxiliary storage case) that houses the fuse box 26 has an auxiliary cover 28 (simply abbreviated below as a cover 28) that covers the case 27 from above.

As illustrated in this drawing, in the rear portion in the vehicle front-rear direction, the cover 28 has an upper wall portion 28*a*, an inner side wall portion 28*b* extending upward from the inner end in the vehicle width direction of the upper wall portion 28*a*, an outer side wall portion 28*c* extending downward stepwise from the outer end in the vehicle width direction of the upper wall portion 28*a*, and a rear wall portion 28*d* extending upward from the rear end of the upper wall portion 28*a*. The cover 28 further has a partition wall portion 28*e* (see FIG. 11B) extending upward from the front end of the upper wall portion 28*a* described above.

As illustrated in FIGS. 7 and 11B, the cover 28 (particularly the upper wall portion 28*a* thereof) described above is provided so as to be located below the outflow portion 50*c* of the catch pan 50 of the wiper pivot WP1 on the outer side in the vehicle width direction. In addition, the upper wall portion 28*a* of the cover 28 described above is set as a cover inclined portion 29, which is inclined downward toward the outer side in the vehicle width direction, as illustrated in FIGS. 7 and 12.

Accordingly, the water drops dripping from the cowl center 40 onto the upper surface (that is, the upper wall portion 28*a*) of the cover 28 via the catch pan 50 are drained to the outer side in the vehicle width direction along the inclination direction of the cover inclined portion 29 described above to suppress the exposure of the fuse box 26 as one of the auxiliaries to water. In addition, the cover 28 described above is used as part of the drain route.

Furthermore, as illustrated in FIG. 12, the lower end 28*f* of the outer side wall portion 28*c* of the cover 28 is offset to the outer side in the vehicle width direction from the upper end 27*a* on the outer side in the vehicle width direction of the case 27 that houses the fuse box 26 as one of the auxiliaries.

The offset structure described above suppresses the infiltration of water from the lower end 28*f* of the cover 28 into the case 27 due to a capillary phenomenon, thereby further suppressing the exposure of the fuse box 26 to water.

The example described above indicates a left-hand drive vehicle that adopts an FR (front engine rear wheel drive) system and has a longitudinally mounted engine unit. By draining water to the outer side in the vehicle width direction by the cover inclined portion 29 described above, the splashing of water on the brake system is suppressed. In addition, as illustrated in FIG. 11B, the partition wall portion 28*e* is provided in the front portion of the upper wall portion 28*a* to prevent water from getting over.

By the way, as illustrated in FIGS. 3 and 4, the drain member 60 extending in the vehicle width direction is provided below the front windshield 4 and below the cowl grille 24, the left and right cowl centers 40 and 41, and the left and right cover members 30 and 33 so that the drain member 60 receives the water drops dripping from the front windshield 4 and drains the water drops through both left and right outer sides thereof in the vehicle width direction.

It should be noted that reference numeral 35 represents an insulator that covers the side of the engine unit in FIGS. 6 and 7, reference numeral 18 represents a cowl reinforcement upper provided below the dash upper panel 12 and reference numeral 19 represents a cowl reinforcement lower provided below the cowl reinforcement upper 18 in FIG. 7. In addition, reference numeral 36 represents an insulator that covers, from above, the rear portion of the engine unit in FIG. 7.

Furthermore, in the drawing, arrow F indicates the vehicle front, arrow R indicates the vehicle rear, arrow IN indicates the inner side in the vehicle width direction, arrow OUT indicates the outer side in the vehicle width direction, and arrow UP indicates the vehicle upper side.

As described above, the front structure of a vehicle according to the above example includes the electrical component (see the wiper motor 16) provided below the front windshield 4 and the gutter member (cowl center 40), provided immediately behind the electrical component (wiper motor 16) and below the front windshield 4, that receives the water dripping from the front windshield 4. The gutter member (cowl center 40) has the flow path portion 47 through which the water drops dripping onto the gutter member (cowl center 40) flow in the vehicle width direction, and the flow path portion 47 includes the uppermost portion 48 that is set to be the highest at position X at which the electrical component (wiper motor 16) is provided in the vehicle width direction and the inclined portions 49R and 49L, disposed adjacent to the uppermost portion 48 in the vehicle width direction, that extend downward toward the inner side in the vehicle width direction and the outer side in the vehicle width direction (see FIGS. 4, 5, and 9).

According to this structure, since the water dripping from the front windshield 4 onto the uppermost portion 48 of the flow path portion 47 of the gutter member (cowl center 40) at position X at which the electrical component (wiper motor 16) is provided flows to the inclined portions 49R and 49L immediately after dripping onto the uppermost portion 48, the exposure of the electrical component (wiper motor 16) to water can be suppressed even if the dimension in the front-rear direction and the dimension in the vertical direction of the gutter member (cowl center 40) at the placement position of the electrical component (wiper motor 16) are small.

In short, even in a layout in which the distance in the vehicle front-rear direction between the front windshield 4 and the electrical component (wiper motor 16) is small, the exposure of the electrical component (wiper motor 16) to water can be suppressed.

In addition, in an embodiment of the present disclosure, the width in the vehicle front-rear direction of the flow path portion 47 in the uppermost portion 48 is set to be the smallest among the other portions (see FIG. 9).

In this structure, even if the width in the front-rear direction of the flow path portion 47 of the uppermost portion 48 is minimum and the drain capacity is low, the exposure of the electrical component (wiper motor 16) to water can be suppressed.

Furthermore, in the embodiment of the present disclosure, the electrical component is the wiper motor 16, the wiper motor 16 is located between the wiper pivots WP1 and WP2, and the wiper pivots WP1 and WP2 have the pivot drain paths (catch pans 50 and 51) through which the water drops dripping from the flow path portion 47 are drained downward (see FIGS. 5 and 11).

According to this structure, the wiper pivots WP1 and WP2 have the pivot drain paths (catch pans 50 and 51) and these pivot drain paths (catch pans 50 and 51) drain the water drops dripping from the flow path portion 47 downward, thereby improving the drain capacity of the gutter member (cowl center 40). In addition, the pivot drain paths (catch pans 50 and 51) described above can be used as part of the drain route.

Furthermore, in the embodiment of the present disclosure, the pair of wiper pivots WP1 and WP2 are provided on the inner side in the vehicle width direction and the outer side in the vehicle width direction, the auxiliary cover (cover 28) that covers, from above, the case 27 housing the auxiliaries (fuse box 26) is provided below the pivot drain path (catch pan 50) of the wiper pivot WP1 on the outer side in the vehicle width direction, and the auxiliary cover (cover 28) described above has the cover inclined portion 29, which is inclined downward toward the outer side in the vehicle width direction (see FIGS. 7 and 12).

According to this structure, the water drops dripping from the gutter member (the cowl center 40) onto the upper surface of the auxiliary cover (cover 28) via the pivot drain path (catch pan 50) can be drained to the outer side in the vehicle width direction along the inclination direction of the cover inclined portion 29 to suppress the exposure of the auxiliaries (fuse box 26) to water. In addition, the auxiliary cover (cover 28) described above may be used as part of the drain route.

In addition, in the embodiment of the present disclosure, the lower end 28f of the auxiliary cover (cover 28) is offset to the outer side in the vehicle width direction from the upper end 27a of the case 27 that houses the auxiliaries (fuse box 26) (see FIG. 12).

According to this structure, the offset structure can suppress the infiltration of water into the case 27 from the lower end 28f of the cover 28 of the auxiliaries (fuse box 26) due to a capillary phenomenon, thereby further suppressing the exposure of the auxiliaries (fuse box 26) to water.

By the way, when the lower end of the auxiliary cover is not offset from the upper end of the case, water infiltrates into the case due to a capillary phenomenon, but the structure described above suppresses the infiltration of water.

In the correspondence between the structure of the present disclosure and the example described above, the electrical component according to the present disclosure corresponds to the wiper motor 16 according to the example, similarly, the auxiliaries correspond to the fuse box 26, the auxiliary cover corresponds to the cover 28, the gutter member corresponds to the cowl center 40, and the pivot drain paths correspond to the catch pans 50 and 51, but the present disclosure is not limited to the structure of the example described above.

For example, the case in which the front structure of a vehicle is adopted in a left-hand drive vehicle has been described in the example described above, but this front structure of a vehicle may be adopted in a right-hand drive vehicle and, in this case, elements such as the cowl center 40, the wiper motor 16, the wiper pivots WP1 and WP2, the catch pans 50 and 51, the case 27, the cover 28, the cover inclined portion 29 are desirably disposed symmetrically with respect to those of a left-hand drive vehicle.

INDUSTRIAL APPLICABILITY

As described above, the present disclosure is useful for the front structure of a vehicle that includes the electrical component provided below the front windshield, and the gutter member, provided immediately behind the electrical component and below the front windshield, that receives water dripping from the front windshield.

DESCRIPTION OF REFERENCE SIGNS AND NUMERALS

4: front windshield
16: wiper motor (electrical component)
26: fuse box (auxiliaries)
27: case
27a: upper end
28: cover (auxiliary cover)
29: cover inclined portion
40: cowl center (gutter member)
47: flow path portion
48: uppermost portion
49R, 49L: inclined portion
50, 51: catch pan (pivot drain path)
WP1, WP2: wiper pivot

The invention claimed is:

1. A front structure of a vehicle, comprising:
a wiper motor provided below a front windshield; and
a gutter provided behind the wiper motor and below the front windshield, the gutter receiving water dripping from the front windshield,
wherein the gutter has a flow path portion through which water drops dripping onto the gutter flow in a vehicle width direction,
the flow path portion includes an uppermost portion at which the wiper motor is provided in the vehicle width direction,
an inclined portion of the flow path portion is disposed adjacent to the uppermost portion in the vehicle width direction, the inclined portion extending downward toward an inner side in the vehicle width direction or extending downward toward an outer side in the vehicle width direction,
a width in a vehicle front-rear direction of the flow path portion in the uppermost portion is set to be smallest among other portions of the flow path portion,
the wiper motor is located between a pair of wiper pivots,
each of the wiper pivots has a pivot drain path through which water drops dripping from the flow path portion are drained downward,
one of the pair of wiper pivots is provided on the inner side in the vehicle width direction and the other of the pair of wiper pivots is provided on the outer side in the vehicle width direction,
an auxiliary cover that covers, from above, a case that houses auxiliaries is provided below the pivot drain path of the other of the wiper pivots that is provided on the outer side in the vehicle width direction, and
the auxiliary cover has a cover inclined portion that is inclined downward toward the outer side in the vehicle width direction.

2. The front structure of a vehicle according to claim 1, wherein a lower end of the auxiliary cover is offset to the outer side in the vehicle width direction from an upper end of the case that houses the auxiliaries.

3. The front structure of a vehicle according to claim 1, wherein the gutter has a recess portion that is recessed toward the rear of the vehicle, the wiper motor is located in front of the recess portion, and the recess portion has a front wall that rises upward from a peripheral edge of the recess portion.

4. The front structure of a vehicle according to claim 1,
wherein the gutter has a recess portion that is recessed toward the rear of the vehicle, the recess portion is located at a left portion of the gutter in the vehicle width direction when viewed from a rear of the vehicle, and the recess portion has a skirt portion extending downward from a peripheral edge of the recess portion, and
wherein one wiper pivot is located in the recess portion.

5. A front structure of a vehicle, comprising:
a wiper motor provided below a front windshield; and
a gutter provided behind the wiper motor and below the front windshield, the gutter receiving water dripping from the front windshield,
wherein the gutter has a flow path portion through which water drops dripping onto the gutter flow in a vehicle width direction,
the flow path portion includes an uppermost portion at which the wiper motor is provided in the vehicle width direction,
an inclined portion of the flow path portion is disposed adjacent to the uppermost portion in the vehicle width direction, the inclined portion extending downward toward an inner side in the vehicle width direction or extending downward toward an outer side in the vehicle width direction,
the wiper motor is located between a pair of wiper pivots,
each of the wiper pivots has a pivot drain path through which water drops dripping from the flow path portion are drained downward,
one of the pair of wiper pivots is provided on the inner side in the vehicle width direction and the other of the pair of wiper pivots is provided on the outer side in the vehicle width direction,
an auxiliary cover that covers, from above, a case that houses auxiliaries is provided below the pivot drain path of the other of the wiper pivots that is provided on the outer side in the vehicle width direction, and
the auxiliary cover has a cover inclined portion that is inclined downward toward the outer side in the vehicle width direction.

6. The front structure of a vehicle according to claim 5,
wherein a lower end of the auxiliary cover is offset to the outer side in the vehicle width direction from an upper end of the case that houses the auxiliaries.

\* \* \* \* \*